United States Patent [19]

Cheshire

[11] 4,454,307

[45] Jun. 12, 1984

[54] ELIMINATION PROCESS

[75] Inventor: Phillip Cheshire, Billinge, nr. Wigan, England

[73] Assignee: Imperial Chemical Industries Plc, London, England

[21] Appl. No.: 530,678

[22] Filed: Sep. 9, 1983

[30] Foreign Application Priority Data

Oct. 4, 1982 [GB] United Kingdom ................ 8228269

[51] Int. Cl.$^3$ ............................................. C08G 61/00
[52] U.S. Cl. .................................. 525/379; 525/381; 525/382; 525/375

[58] Field of Search ................ 525/379, 381, 382, 375

*Primary Examiner*—Paul R. Michl
*Assistant Examiner*—Alex H. Walker
*Attorney, Agent, or Firm*—Cushman, Darby & Cushman

[57] ABSTRACT

A process for the preparation of polyarylenes by the amine-catalyzed elimination of carbonate groups from polymers which contain in the backbone thereof cyclohex-2-enylene rings bearing carbonate groups is disclosed. The products of the process are particularly useful as insulating materials.

10 Claims, No Drawings

ELIMINATION PROCESS

This invention relates to the preparation of polymers which have aromatic rings in the backbone thereof.

Our copending European Patent Application Publication No. 76605A describes the preparation of polymers which have aromatic rings in the backbone thereof by treating certain poly(5,6-disubstitutedcyclohexa-1,3-diene) homo or copolymers under conditions such that elimination of the 5,6-substituents occurs.

We have now found that where the aforesaid 5,6-substituents are carbonate groups such elimination can be catalysed by organic amines and that often the organic amine may be readily removed from the product. Furthermore, the rates of elimination are often faster than the rates observed when the elimination reaction is carried out in the presence of the reagents specifically disclosed in the aforesaid published European Patent Application. The products of the process do not contain metallic residues from the elimination catalyst and hence offer advantages where they are to be used as insulants or dielectric capacitants.

Accordingly, the present invention provides a process for the preparation of a polymer having aromatic rings in the backbone thereof which process comprises treating a polymeric composition comprising a polymer which has cyclohex-2-enylene rings bearing carbonate groups at the 5,6 positions in the polymer backbone with a suitable organic amine such that the carbonate groups are eliminated from at least substantially all of the said cyclohexenylene rings.

The organic amine which is used in the process of the present invention is preferably a weak nucleophile and a strong base (by which we mean it has pKa of more than 7 and preferably more than 10) and more preferably is readily volatilsed under suitable conditions.

The presence of bulky groups in the organic amine tends to sterically hinder its attack on carbon centres and hence reduces its nucleophility.

The amine used in the process of the present invention may be a primary amine, a secondary amine or a tertiary amine. The hydrocarbyl groups in the amine may be alkyl, aryl, alkaryl or aralkyl and where a plurality of hydrocarbyl groups are present, i.e. the amine is a secondary or tertiary amine, the hydrocarbyl groups may be the same or different.

As examples of suitable amines may be mentioned, ethylamine, laurylamine, hexamethylenediamine, ethylenediamine, 4,4'-diaiminodiphenylmethane, di-n-octylamine, di-isopropylamine, piperidine, pyridine, bipyridyl.

It is often preferred that the amine is a tertiary amine, for example a tertiary alkyl amine $R^1_3N$ (where $R^1$, each of which may be the same or different, is an alkyl group having one to 12 carbon atoms e.g. n-butyl or n-octyl) or an alkylarylamine, e.g. 1,8-bis-dimethylaminonaphthalene.

An organic amine used in the process of the present invention will have a volatility such that sufficient remains in the polymer during the process of the present invention to catalyse the desired elimination and may be readily removed from the polymer, where removal is desired, by increasing the temperature and/or decreasing the pressure after catalysis is complete. However, we do not exclude the possibility that removal may be effected by a suitable solvent treatment. Typically the amine has a boiling point at ambient pressure in the range 200° C. to 600° C.

The 5,6-substituents in the polymer of which the polymeric composition which is used in the process of the present invention is comprised may be cis or trans to each other.

Preferably the polymer of which the polymeric composition which is used in the process of the present invention is comprised has a structure which may be represented by the general formula:

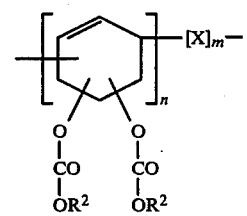

wherein the cyclohexenylene ring and the residue X, where X is present, may vary from unit to unit along the polymer chain; each $R^2$, which may be the same or different, is a hydrocarbyl group, e.g. an aryl group or an alkyl group having up to twelve carbon atoms; X is the residue of one or more polymerisable comonomers; n is a whole number; m is 0 or a whole number; and the ratio of n:m lies in the range 1:0 to 1:100. Preferably $R^2$ is an alkyl group having up to four carbon atoms and more preferably is methyl.

By "polymerisable comonomer" we mean a compound which can be reacted under polymerisation conditions with a 1,2-disubstituted-cyclohexa-3,5-diene which has 1,2-substituents as hereinbefore defined to form a copolymer therewith.

Examples of suitable polymerisable comonomers of which the polymer which is used in the present invention may be comprised include vinyl monomers, for example, olefinic hydrocarbons, e.g. styrene and ethylene, methacrylates, vinyl halides, vinyl esters, acrylonitrile and tetrafluoroethylene; and compounds such as carbon monoxide, carbon dioxide and sulphur dioxide.

In polymers of general formula I, in substantially all of the cyclic rings, each of the bonds which bind the cyclic ring into the polymer backbone is preferably attached to a carbon atom adjacent the olefinic double bond in the cyclic ring, i.e. the cyclic rings are bonded in the polymer backbone at the 1,4-positions.

In polymers of general formula I, n is preferably greater than about 400 to give improved mechanical properties; and m is preferably 0, to increase the thermal stability of the product.

The residues X, where present, and the cyclohexenylene rings preferably form an alternating copolymer; and the group X, where present, is preferably the residue of a polymerisable comonomer chosen from the group consisting of

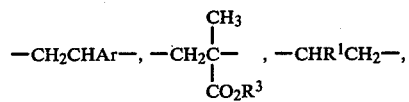

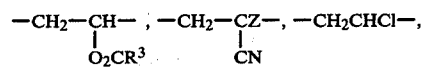

-continued

—CF$_2$CF$_2$—, —CO—, and —SO$_2$—, (where Z is a halogen atom or R$^3$ and R$^3$ is hydrogen or R$^1$, where R$^1$ has the meaning hereinbefore ascribed to it) and more preferably is —CH$_2$CHPh—, —CH$_2$CMeCO$_2$Me, or —CH$_2$CHCN—.

Although we do not exclude the possibility that the process of the present invention may be carried out by treating the polymeric composition as hereinbefore defined in solution in a suitable solvent, e.g. squalane, sulpholane or dimethylformamide, it is often preferred that a neat polymeric composition, preferably comprising a polymer of general formula I, is employed.

The process of the present invention may be carried out on a polymeric blend which comprises a polymeric composition as hereinbefore defined and a suitable second polymer. As examples of suitable second polymers may be mentioned inter alia polystyrene, polyphenylene oxide and polyethylene terephthalate. It will be appreciated that where the process is carried out on such a blend the product thereof will likewise be a polymeric blend which comprises a polymer which has aromatic rings in the backbone thereof and a suitable second polymer.

The process of the present invention is preferably carried out at a temperature in the range 100° C. to 300° C. and more preferably in the range 180° C. to 260° C., typically for a period of several hours. It will be appreciated that the particular temperature employed will depend on the catalyst which is used.

The amount of organic amine used in the process of the present invention is preferably between 0.1 and 5 mole % and more preferably between 1 and 2 mole %.

Where it is desired to remove the organic amine from the product this may be effected by a suitable heat treatment, e.g. heating at 300° C. under vacuum, or treatment with a suitable solvent for the amine, which solvent does not have a deleterious affect on the polymer.

It is often preferred that the process of the present invention is carried out on a polymeric composition which is in the form e.g. of a film, coating or fibre, which it is desired that the product of the process adopt. Furthermore, it is often preferred that the shaped and/or formed cyclohexenylene polymer is subjected to a tensile stress during treatment under the aforesaid conditions since such a stress tends to increase the tensile modulus of the resulting product, e.g. a fibre.

Where a process of the present invention is carried out on a suitable polymer which is in the form of a film or coating, the film or coating may be prepared by evaporation of a solution of the polymer in a suitable solvent, which preferably has a boiling point above 40° C., or the film may be prepared from a melt thereof. As examples of suitable solvents may be mentioned inter alia halogenated hydrocarbons, e.g. o-dichlorobenzene and ethylene dichloride, and ethers, e.g. dioxane.

Where the process of the present invention is carried out on a suitable polymer which is in fibrous form, the fibres are conveniently prepared by dry spinning the polymer from a suitable solvent, e.g. methylene chloride.

The process of the present invention is preferably effected in a vacuo or in an inert atmosphere, e.g. nitrogen. The resulting polymer is often at least 90% polyphenylene as indicated by microanalysis and IR analysis.

We do not exclude the possibility that the process of the present invention may be carried out on a polymer which has substantially a three dimensional shape, e.g. a solid cube. Where elimination is effected on a polymer of such a shape and where the polymer comprises suitably volatile substituents, or derivatives thereof, which are eliminated during the process, a foamed product may be produced. Where it is desired to produce a foamed product it is often preferred that the elimination reaction is effected by induction heating.

The poly(cyclohexa-1,3-diene-5,6-ylene dicarbonates) used in the process of the present invention are conveniently prepared by polymerisation of the corresponding monomer as is more fully described in European Patent Application Publication No. 76605A, the disclosure of which is incorporated herein by way of reference, which monomeric carbonates may be prepared from 5,6-dihydroxycyclohexa-1,3-diene by techniques well known in the art. However, we do not exclude the possibility that the poly(cyclohexa-1,3-diene-5,6-ylene dicarbonate) may be prepared from a poly(5,6-disubstitutedcyclohexa-1,3-diene), e.g. poly(5,6-dihydroxycyclohexa-1,3-diene).

An additive may be present in the polymeric composition used in the process of the present invention which additive absorbs or reacts with the eliminated carbonate groups. For example, where methanol is eliminated a silane, e.g. coated on glass microsphers, may be used to react with the methanol.

The present invention will now be described by reference to the following Examples which are illustrative of the invention.

EXAMPLES 1–11

These Examples illustrate the use of tri-n-octylamine as catalyst for the aromatisation of poly[cyclohexa-1,3-diene-5,6-ylene di(methylcarbonate)].

Preparation of poly[cyclohexa-1,3-diene-5,6-ylene di(methyl carbonate)]

Cyclohexa-1,3-diene-5,6-ylene di(methyl carbonate) (72.4 grams; 317.5 mmoles) and azobisisobutyronitrile (350 mgs; 2.13 mmoles) in an ampoule, were subjected to three freeze-thaw cycles to remove traces of oxygen. The ampoule was sealed under vacuum and immersed in a water bath at 50° C. for 5½ days.

A clear glassy product was recovered from the ampoule and dissolved in chloroform (400 mls). The chloroform solution was added dropwise with stirring to hexane (2 liters) to give a precipitate which was filtered off and washed with 10% v/v chloroform/hexane and then twice with hexane. The precipitation/washing cycle was repeated until the monomer content of the polymer was about 0.5%.

The yield of polymer was 56.2 grams. It was shown by gel permeation chromatography to have Mn of 114000, Mw of 343,000 and D of 3.0 and by laser light scattering to have Mw of 180,000.

General Procedure

Approximately 1 gram of the polymer was dissolved in chloroform (10 ml), a solution of tri-n-octylamine (2 mole %) in chloroform was added to the solution, the mixture was shaken and evaporated to dryness in a test-tube under a stream of nitrogen. Traces of residual chloroform were removed in a vac oven at room temperature for 2 hours.

The test-tube was then heated, under vacuum or in a nitrogen atmosphere, for a specified time at a specified temperature.

The results are shown in Table 1.

TABLE 1

| Example No | Temperature °C. | Starting Weight (grams) | Final Weight (grams) | % Crystallinity | Atmosphere | Time (Hours) |
|---|---|---|---|---|---|---|
| 1 | 350 | 1 | 0.3 | 31 | A | 2.3 |
| 2 | 300 | 1 | 0.3 | 58 | B | 2.3 |
| 3 | 300 | 0.9 | 0.31 | 46 | B | 1.5 |
| 4 | 300 | 0.9 | 0.31 | 52 | B | 2.5 |
| 5 | 300 | 0.9 | 0.3 | 55 | B | 4 |
| 6 | 300 | 0.9 | 0.3 | 56 | B | 7 |
| 7 | 250 | 0.9 | 0.33 | a | B | 4 |
| 8 | 250 | 0.9 | 0.33 | a | B | 6.6 |
| 9 | 275 | 0.9 | 0.3 | a | B | 3.2 |
| 10 | 275 | 0.9 | 0.3 | a | B | 6.1 |
| 11 | 220 | 1 | 0.3 | a | B | 20 | a: Not determined
A: Nitrogen
B: Vacuum

EXAMPLE 12

This Example illustrates the use of tri-N-octylamine in the preparation of polymer blends.

Polystyrene (500 mg) and poly[cyclohexa-1,3-diene-5,6-ylene di(methylcarbonate)] (190 mg) were dissolved in 5 ml of a chloroform solution containing 0.05 mmoles of tri-n-octylamine in a heavy walledglass tube. The solvent was removed under reduced pressure and the evacuated glass tube was sealed. After heating for 6 hours at 245° C. the tube was cooled and opened. IR spectroscopic analysis of the polymer mixture showed the absence of carbonate absorption peaks and the presence of absorption peaks (e.g. 810 cm$^{-1}$) associated with polyphenylene. The polymer blend was treated with refluxing THF and a very finely dispersed insoluble fraction was separated. The IR spectrum of this material showed it to be rich in polyphenylene.

EXAMPLE 13 AND 14

These Examples illustrate the affect of temperature on the rate of aromatisation catalysed by tri-n-octylamine.

A solution of the catalyst and poly[cyclohexa-1,3-diene-5,6-ylene di(methylcarbonate)] was evaporated to dryness. Approximately 2 milligrams of the residue were analysed by isothermal gravimetric analysis from which the approximate half-life of the reaction was determined.

The results are shown in Table 2, along with half-lives from comparative experiments, from which the increased rate of aromatisation on use of tri-n-octylamine can be seen. In Table 2 "CT" is a comparative experiment.

TABLE 2

| Example | Catalyst | Mole % Catalyst | Temperature °C. | Half-life (minutes) |
|---|---|---|---|---|
| 13 | (n-Octyl)$_3$N | 0.5 | 220 | 2 |
| 14 | (n-Octyl)$_3$N | 0.5 | 240 | 1 |
| CT | None | — | 260 | 26–30 |
| CT | KBr | 0.5 | 220 | 6–10 |
| CT | KOH | 1.0 | 220 | 5 |

EXAMPLES 15–27

These Examples illustrate the use of a range of amines in the process of the present invention.

The procedure of Example 1 was repeated except that a range of amines as indicated in Table 3 was used instead of tri-n-octylamine.

TABLE 3

| Example No | Catalyst (mole %) | Temperature (°C.) | Half-life (minutes) |
|---|---|---|---|
| 15 | 1,8-bis (dimethylamino)-naphthalene (2.0) | 260 | 2.7 |
| 16 | Laurylamine (2.0) | 260 | 0.25 |
| 17 | Laurylamine (2.0) | 240 | 0.42 |
| 18 | Laurylamine (2.0) | 220 | 1.12 |
| 19 | Laurylamine (2.0) | 200 | 5.78 |
| 20 | Di-n-octylamine (1.0) | 260 | 0.19 |
| 21 | Di-n-octylamine (1.0) | 220 | 0.30 |
| 22 | 4,4'bipyridyl (2.0) | 260 | 3.81 |
| 23 | 4,4'bipyridyl (2.0) | 220 | 21.66 |
| 24 | 4,4'diamino-diphenylmethane (2.0) | 260 | 1.65 |
| 25 | 4,4'diamino-diphenylmethane (2.0) | 220 | 10.2 |
| 26 | Tri-n-butylamine (2.0) | 260 | 0.24 |
| 27 | Tri-n-butylamine (2.0) | 200 | 2.18 |

I claim:

1. A process for the preparation of a polymer having aromatic rings in the backbone thereof which process comprises treating a polymeric composition comprising a polymer which has cyclohex-2-enylene rings bearing carbonate groups at the 5,6 ring positions in the polymer backbone with a suitable organic amine such that the carbonate groups are eliminated from at least substantially all of the said cyclohexenylene rings.

2. A process as claimed in claim 1 wherein the polymer which has cyclohex-2-enylene rings in the backbone thereof has a structure represented by general formula:

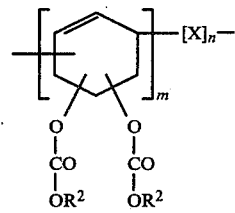

wherein the cyclohexenylene ring and the residue X, where
X is present, may vary from unit to unit along the polymer chain;
each R$^2$, which may be the same or different, is a hydrocarbyl group;
X is the residue of one or more polymerisable comonomers;

n is a whole number;

m is 0 or a whole number; and the ratio of n:m lies in the range 1:0 to 1:100.

3. A process as claimed in claim 2 wherein the polymer which has cyclohex-2-enylene rings in the backbone thereof has a structure represented by general formula

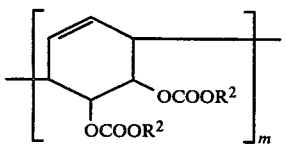

4. A process as claimed in claim 3 wherein $R^2$ is an alkyl group having up to four carbon atoms.

5. A process as claimed in claim 1 wherein the organic amine is a tertiary amine.

6. A process as claimed in claim 1 wherein the amine has a boiling point at ambient pressure in the range 200° C. to 600° C.

7. A process as claimed in claim 1 carried out in the range 100° C. to 300° C.

8. A process as claimed in claim 1 wherein the concentration of amine in the reaction mixture is between 0.1 and 5 mole %.

9. A process as claimed in claim 1 wherein the polymeric composition is in the form of a film, coating or fibre.

10. A process as claimed in claim 1 wherein the polymeric composition comprises a polymeric blend.

* * * * *